Feb. 9, 1954   E. A. BACCHI   2,668,400
LAPIDARY TOOL
Filed Feb. 23, 1952
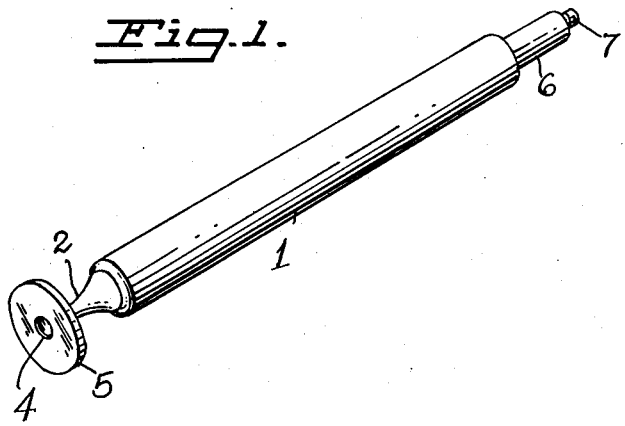
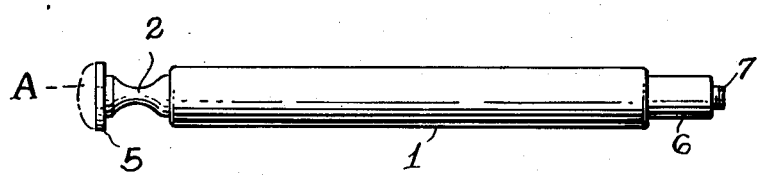
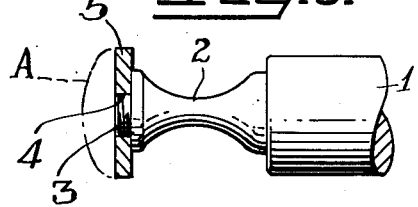
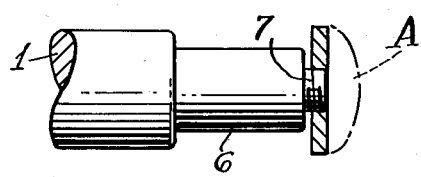
INVENTOR.
EUGENE A. BACCHI
BY
*JETrabucco*
ATTORNEY Patented Feb. 9, 1954

2,668,400

UNITED STATES PATENT OFFICE 2,668,400

LAPIDARY TOOL

Eugene A. Bacchi, San Francisco, Calif.

Application February 23, 1952, Serial No. 273,039

3 Claims. (Cl. 51—229)

1

This invention relates to an improved lapidary tool of the type used to conveniently hold a stone during a polishing operation.

Lapidary tools, such as dop sticks, when used to securely hold stones during polishing operations, require the use of a considerable mass of sealing wax or dop cement to secure a stone to an end of a dop stick. The proper application of the dop cement when the stone is mounted on the dop stick requires considerable time and effort, and after the stone is polished it sometimes becomes necessary to use external pressures by means of an implement to pry the stone from the end of the dop stick. In detaching a polished stone from the dop stick by this and other well known methods, the stone is frequently damaged, particularly if it happens to have a brittle structure.

The present invention overcomes these and other known disadvantages accompanying the use of dop sticks of the kind now commonly used, by providing a novel lapidary tool which is so constructed that a stone may be conveniently mounted thereon and easily detached therefrom without danger of damaging the stone. More specifically, my invention embodies an elongated lapidary tool having a stone supporting plate or disc attached to one end thereof by a short threaded member screwed into a threaded hole in the plate, and also having a somewhat longer threaded member at its opposite end which when screwed into the threaded hole of the plate after the removal of the short threaded member will exert an outward pressure on the stone sufficient to break the cement material securing the stone to the plate and thereby cause the detachment of the stone from the plate.

Other and further advantages and objects of my invention will be pointed out hereinafter or will be indicated in the appended claims, or will be obvious to one skilled in the art upon an understanding of the present disclosure. For the purposes of this application I have elected to show herein certain forms and details of a lapidary tool which is representative of my invention; it is to be understood, however, that the embodiment of my invention herein shown and described is for the purpose of illustration only and that therefore it is not to be regarded as exhaustive of the variations of the invention.

In the accompanying drawings:

Fig. 1 is a perspective view of a lapidary tool embodying my invention;

Fig. 2 is a side view of the tool, showing a stone in broken lines, attached thereto;

2

Fig. 3 is an enlarged view of the end portion of the tool to which the stone is attached, showing the stone supporting plate in section;

Fig. 4 is an enlarged view of the opposite end of the tool showing the plate in section, and also illustrating diagrammatically the use of this particular end of the tool in detaching the stone from the plate.

Referring to the drawings, the numeral 1 designates an elongated handle of suitable size and shape, having an extension 2 at one end which has a substantially flat end surface which lies in a plane preferably at right angles to the longitudinal axis of the handle. The extension 2 is provided with a projecting threaded member 3 extending from its flat end surface which is adapted to screw into a threaded hole 4 provided centrally in a suitably shaped flat stone supporting plate or disc 5. The lengths of the hole 4 and the threaded member 3 are such that when the plate 5 is in abutting relationship with the flat end surface of the extension 2 the outer end of the threaded member will be positioned inwardly from the outer flat surface of the plate, thereby providing a centrally disposed depression in the outer flat surface of the plate which is capable of holding a quantity of dopping cement or sealing wax when a stone A is attached to the plate. In ordinary practice a suitable amount of dopping cement or the like is first applied in liquid form to the outer exposed surface of the plate 5, with some of such cement filling the central depression in the plate. The flat side of the stone A is pressed against the cement, and upon the setting thereof the stone will become securely attached to the plate, thereupon permitting the lapidist to conveniently hold the stone against an abrasive or polishing element by means of the handle 1. The extension 2 extending from that part of the handle 1 which is normally held by the artisan using the tool, is formed with enlarged end portions and a narrow or restricted central portion, the latter being considerably smaller in circumference than the said end portions. The extension, being formed with a narrow or restricted central portion, normally avoids the overheating of the handle, thereby making it possible for the handle to be comfortably held while the tool is in use.

The opposite end of the handle 1 is provided with a cylindrical or other suitably shaped extension 6 which has a somewhat longer threaded member 7 projecting from its outer end. The threaded member 7 is adapted to screw into the threaded hole 4 of the stone supporting plate 5, and such threaded member is of sufficient length to project outwardly beyond the outer surface of the plate. Thus after the completion of the polishing operation when it is desired that the stone A be detached from the plate 5, the threaded member 3 is unscrewed from the threaded opening 4, thereby permitting the plate with the attached stone to be manually transferred to the opposite end of the tool where the longer threaded member 7 is inserted into the threaded opening 4 and screwed into such opening until its end projects against the flat inner side of the stone. The continued screwing of the threaded member 7 into the threaded opening 4 of the stone supporting plate 5 will exert a sufficient outward pressure against the stone A to cause its detachment from the plate.

The threaded members 3 and 7 are of the same diameter and their threads are of the same pitch, and the threaded hole 4 of the stone supporting plate 5 has threads of the same pitch as the threads of the threaded members; and the diameter of the hole is such that the threads of either of the threaded members will engage with the threads thereof.

What I claim is:

1. A lapidary tool comprising a handle, a short threaded member of predetermined length extending from one end of the handle, a longer threaded member extending from the opposite end of the handle, the said threaded members being of the same diameter and having threads of the same pitch, and a stone supporting element having a threaded hole therein, the said hole having threads of the same pitch as the threads of the threaded members, and the said hole being of a size permitting the engagement of its threads with the threads of either of the threaded members, the length of the short threaded member being such that when fully screwed into the threaded hole of the stone supporting element the end thereof will not extend to the outer surface of the said element, and the length of the longer threaded member being such that the end thereof is adapted to extend outwardly beyond the outer surface of the said stone supporting element when fully screwed into the threaded hole thereof.

2. A lapidary tool comprising a supporting handle, a short threaded member of predetermined length extending from the supporting handle, a longer threaded member also extending from the handle, the said threaded members being of the same diameter and having threads of similar pitch, and a stone supporting element having a threaded hole therein, the said hole having threads of substantially the same pitch as the threads of the threaded members, and the said hole being of a size permitting the engagement of its threads with the threads of either of the threaded members, the length of the short threaded member being such that when fully screwed into the threaded hole of the stone supporting element the end thereof will not extend outwardly beyond the outer surface of the said element, and the length of the longer threaded member being such that the end thereof is adapted to extend outwardly beyond the said outer surface of the stone supporting element when fully screwed into the threaded hole thereof.

3. In a hand tool for use in polishing stones, an elongated handle for manually holding the tool during a stone polishing operation, an extension on one end of the handle, the said extension having enlarged end portions and a substantially smaller central portion, a threaded member secured at one of its ends to an enlarged end portion of the extension, a stone supporting member having an outer face and a threaded hole extending from the inner side to the outer face of the stone supporting member, the said threaded hole being adapted to receive the threaded member, the lengths of the threaded hole and the threaded member being such that when the stone supporting member is screwed on the threaded member the free end of the threaded member does not extend to the outer face of the stone supporting member, whereby a cement receiving depression is formed in the outer face of the stone supporting member.

EUGENE A. BACCHI.

References Cited in the file of this patent

UNITED STATES PATENTS

| Number | Name | Date |
|---|---|---|
| 1,196,711 | Maynard | Aug. 29, 1916 |
| 1,219,461 | Johnston | Mar. 20, 1917 |